Jan. 7, 1936.    J. R. DAVIS    2,026,520
INTERNAL COMBUSTION ENGINE
Filed July 5, 1929    3 Sheets-Sheet 1
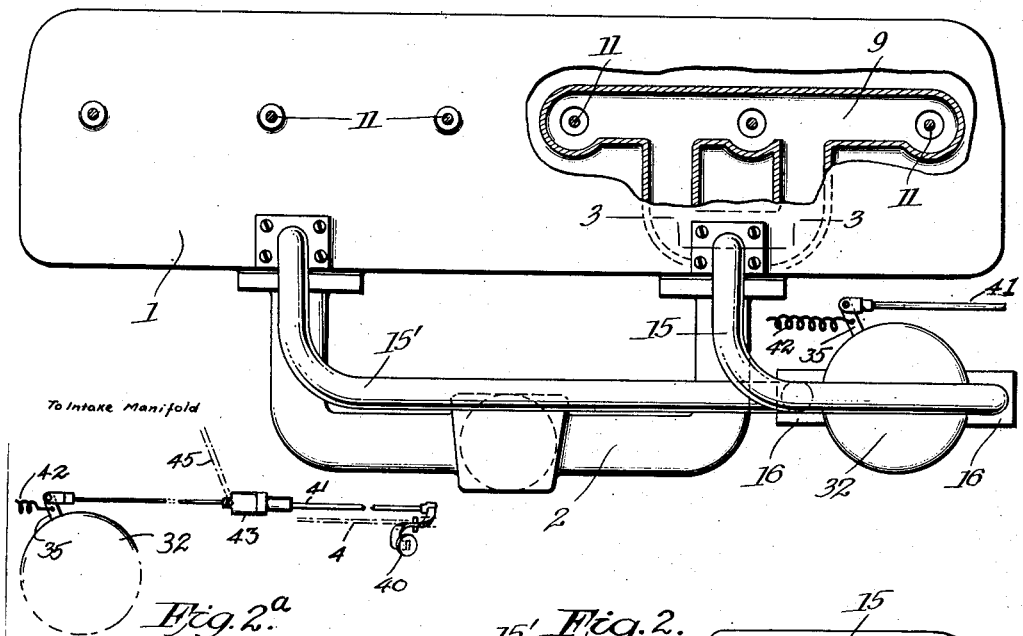
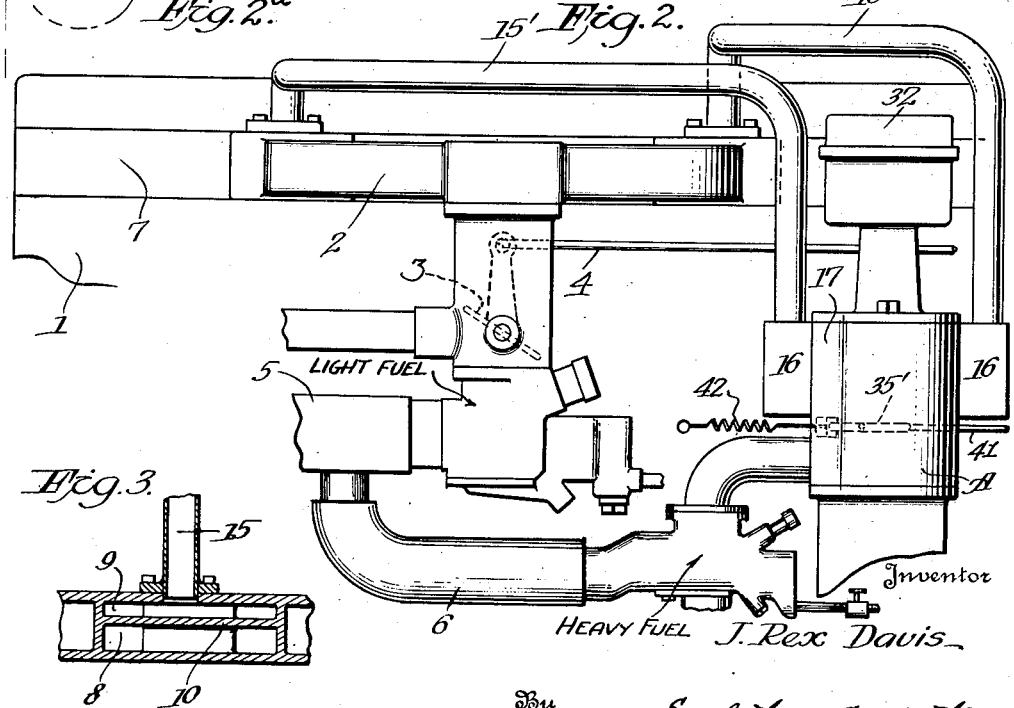

Jan. 7, 1936.  J. R. DAVIS  2,026,520
INTERNAL COMBUSTION ENGINE
Filed July 5, 1929   3 Sheets-Sheet 2
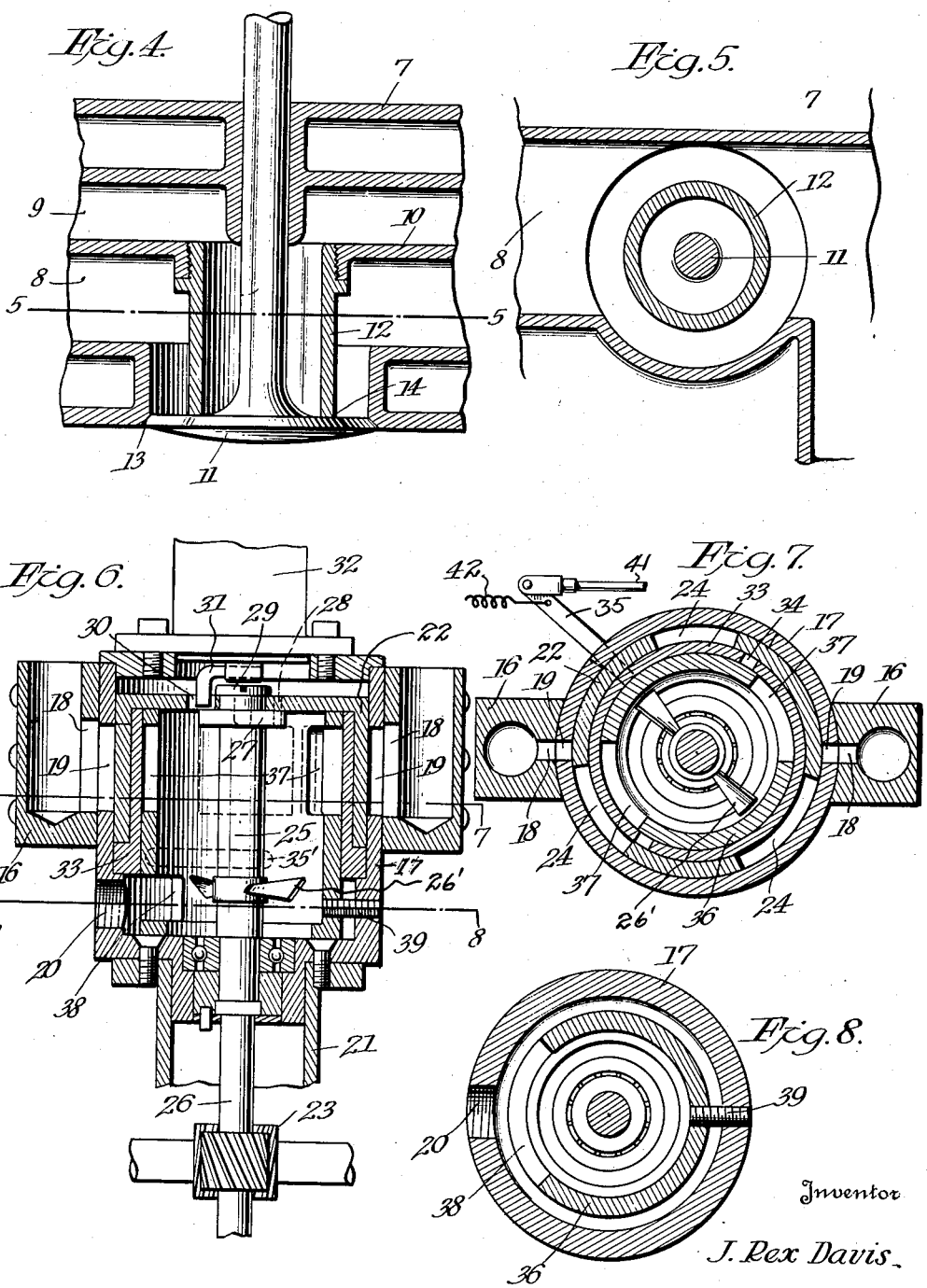

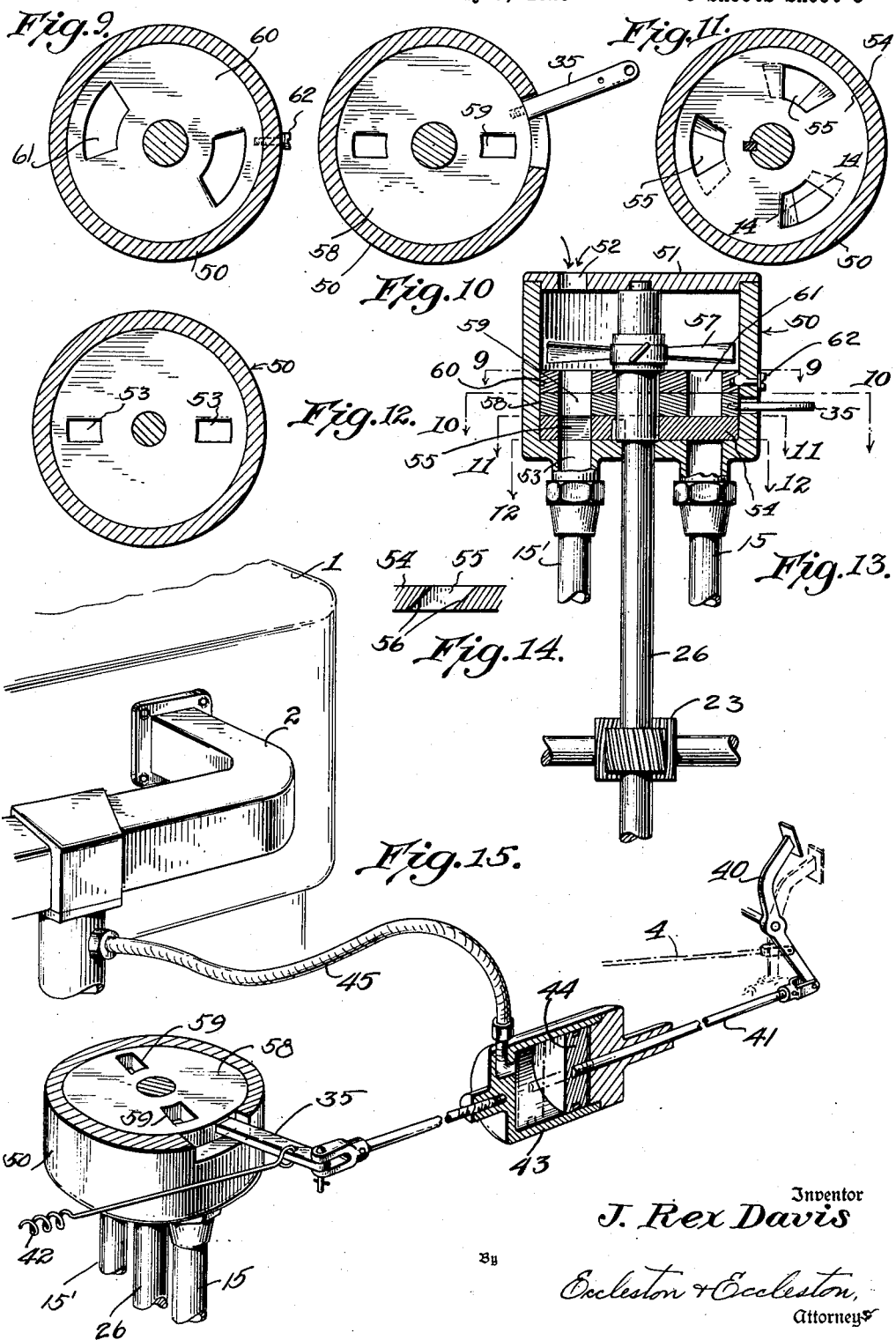

Patented Jan. 7, 1936

2,026,520

UNITED STATES PATENT OFFICE 2,026,520

INTERNAL COMBUSTION ENGINE

Joseph Rex Davis, Clarksburg, W. Va.

Application July 5, 1929, Serial No. 376,213

34 Claims. (Cl. 123—119)

This invention relates to internal combustion engines, and has for its primary object a method of controlling the entrance of gases into the cylinder so as to obtain the conversion of a greater percentage of the energy contained in the fuel into usable power than has previously been practical.

According to the broad scope of the invention, I have discovered a method of proportioning the explosive mixture and auxiliary air to form a charge which will produce a higher rate of flame propagation through the explosive gases. This is accomplished by initially charging air without explosive mixture into the cylinder, then further air and explosive mixture, and finally relatively richer explosive mixture.

I have found that where the auxiliary air is admitted through the inlet valve steps must be taken to prevent premature backfire caused by mixing of the initial auxiliary air with the explosive mixture in the inlet manifold behind the inlet valve. Such mixing forms an explosive mixture which flows into the cylinder and ignites as soon as the inlet valve opens. I overcome this by causing the auxiliary air to be admitted at the inlet valve as soon as it opens and directed backward toward the carburetor to force the combustible charge away from the air inlet so that the initial air can flow into the cylinder so free of combustible gas as to be non-explosive. The combustible gas can then be admitted in parallel with the auxiliary air until the desired volume is admitted, whereupon the air is cut off, and the remainder of the cylinder filled with relatively rich combustible gas. Thereby, a stratified charge is produced, comprising an initial or bottom stratum of non-explosive gas, an intermediate richer stratum which may or may not be explosive, and the final stratum of explosive gas which will be ignited by the spark and fire the whole charge.

A further object of the invention is to supply a charge for an internal combustion engine containing auxiliary air so controlled as to overcome the previous tendency to backfire, inefficiency, and uncertainty under varying speed and power conditions. While a number of proposals have heretofore been made to use auxiliary air admitted by a supplementary timed valve, none have gone into use because of impracticability for one or more reasons, such as complexity and expense, backfiring, lack of flexibility under widely varying speed and power conditions, inefficiency, etc.

I have discovered that backfiring in the admission passage is overcome if the inlet passage adjacent the valve is sufficiently flushed with air as the inlet valve opens as to remove combustible gas left therein when the inlet valve closes. Thereby, the end of the inlet manifold or valve chamber before charging is so denuded of combustible mixture that opening of the inlet valve supplies initial auxiliary air to the cylinder during the first portion of the piston stroke without backfiring. During the stroke, combustible mixture is also drawn in with the air by a novel parallel system of air and combustible gas passages which are automatically self regulating to maintain the proper proportion of fuel for the best economy. By my invention, I can admit auxiliary air through the conventional inlet poppet valve, sleeve valve, rotary valve, and other types of engines, without changing their operation. The auxiliary air is further controlled by a timed valve arranged to cut off the air during the suction stroke, thereafter only relatively richer combustible mixture being drawn in during the final portion of the suction stroke. The final result is to produce a somewhat stratified body of gas in the cylinder, comprising air adjacent the piston, an intermediate stratum of relatively thin explosive mixture, and an upper relatively richer mixture which when compressed will fire easily and uniformly and consume a minimum of fuel.

In the operation of the conventional internal combustion engine it is customary to control the speed or power by varying exclusively the quantity of the gases entering the cylinder, thereby varying the cylinder pressure at the completion of the induction stroke, which materially reduces the efficiency of the engine accordingly as this is less than full atmospheric pressure. This reduction of efficiency is the result of two principal causes, the greatest of which is the reduction of the compression pressure at time of ignition; the other is occasioned by the added load on the engine due to the partial vacuum when the quantity of mixture is restricted. Both of these objectionable features are either minimized or entirely eliminated by causing a full quantity of compressible gases to enter the cylinder during the induction stroke. And also a very material increase in efficiency is obtained, without any sacrifice of control by dividing the total quantity of gases into two parts, one of which is explosive and the other non-explosive, and so proportioning the quantity of the explosive part to that which is non-explosive as to obtain the desired control and yet always operate on a higher mean compression pressure than is ordinarily obtained.

A number of internal combustion engines have been heretofore devised and patented which were directed to the general idea of providing uniform compression pressure in the cylinder, but such prior attempts have been uniformly impractical or entirely inoperative because of the limited space in the combustion chamber of modern engines for additional mechanism, or no means was provided for properly proportioning and segregating the explosive portion of the cylinder contents from the non-explosive. The defects of prior attempts have been entirely overcome by the present invention of which the following is a description in detail.

The invention will be more fully understood in connection with the description of the accompanying drawings, wherein:

Figure 1 is a plan view of the cylinder head and associated mechanism, parts being broken away to disclose the air manifold.

Figure 2 is a fragmentary side elevational view of the engine.

Figure 2ᵃ is a plan view of the operating means for the air valve, parts being broken away.

Figure 3 is a vertical sectional view taken on line 3—3 of Figure 1.

Figure 4 is an enlarged fragmentary sectional view through the cylinder head, showing one of the admission valves in elevation.

Figure 5 is a horizontal sectional view taken on line 5—5 of Figure 4.

Figure 6 is a vertical sectional view of the control mechanism for the air manifold.

Figure 7 is a horizontal sectional view taken on line 7—7 of Figure 6.

Figure 8 is a horizontal sectional view taken on line 8—8 of Figure 6.

Figures 9, 10, 11 and 12 are horizontal sectional views of a modified construction of air valve taken on lines 9—9, 10—10, 11—11 and 12—12, respectively, of Figure 13.

Figure 13 is a vertical sectional view through the second form of air valve.

Figure 14 is a fragmentary sectional view of the rotary control plate of the modified valve taken on line 14—14, Figure 11; and Figure 15 is an assembled view of the admission manifold, air valve and operating mechanism, parts being cut away to more clearly disclose the construction.

Referring to the drawings more specifically, and especially to the disclosure of Figures 1 to 8, inclusive, the numeral 1 indicates a cylinder block here shown as provided with six cylinders, although it will be understood that the invention about to be described is equally well adapted to various other types of internal combustion engines. The engine is provided with a manifold 2 and a throttle valve 3 operated by a connecting rod 4. Any conventional type of air cleaner is also preferably provided and its pipe connection is indicated by the numeral 5. Connected with this pipe 5 leading from the air cleaner is a by-pass 6 by means of which the cleaned air is conveyed to an air valve A to be described hereinafter in detail.

The head of the cylinder which is designated by numeral 7 is constructed to provide two manifolds; one for communication with the admission manifold 2 and forming an extension thereof, and the other to conduct air to the respective cylinders. The admission manifold for the explosive mixture is indicated by the numeral 8, while that for the passage of air is indicated by numeral 9. In the construction as depicted on the accompanying drawings, the two manifolds 8 and 9 are formed in the cylinder head by means of a horizontal partition 10, and this partition is provided with an opening in line with the admission valve 11 for each cylinder and to which is connected a pipe 12. This pipe terminates flush with the seat 13 of the admission port and is also ground to provide a seat 14 for cooperation with the inner face of the admission valve, so that when the valve 11 is moved to closed position it closes off both the admission manifold for the explosive mixture as well as that for the admission of air. When open the negative pressure in the manifold draws in air from manifold 9 before or simultaneously with the induction of air into the cylinder (depending on the cylinder pressure) and thus denudes the passage up to the valve of the relatively rich mixture therein. This body of air will pass into the cylinder before further combustible charge from manifold 8 is drawn in. The valve 11, as well as the exhaust valves, may be operated in any conventional manner.

The manifolds for a six-cylinder engine are often provided with two sections, each leading to a set of three cylinders, and the present construction is of that type. For other number of cylinders, the manifolds will be designed accordingly, following present practice. Also, for the purpose of conveying air to the several cylinders I have provided two conduits 15 and 15' leading from the air valve A to the cylinder head and directed downwardly through the top thereof so as to communicate with the air manifolds 9. The opposite ends of the conduits 15—15' are disposed in blocks 16 bolted to opposite sides of the air valve casing 17 and provided with passages 18 communicating with passages 19 on opposite sides of the casing.

Air from the conventional type of air cleaner is carried through a conduit 6 and is admitted to the interior of the air valve A by means of an opening 20 in which a connection from conduit 6 is threaded. The air valve or distributor, is mounted between casing 21 and the ignition distributor and its sleeve 22 is rotated at one-half crank shaft speed by means of the gears 23 which operate the distributor for the ignition system. Sleeve 22, which is provided with three openings 24 for the passage of air to the cylinders, is fixedly secured at its upper end to the upper end of a shaft 25. This shaft is driven by the main distributor shaft 26 and is, therefore, caused to rotate at one-half crank shaft speed. The upper end of the shaft 25 is provided with an integral head 27, to which the upper end of the sleeve 22 is fixed by means of a pin 28, and these two elements are held against relative longitudinal movement by means of a screw 29. This sleeve 22 is also provided with an opening 30 to receive a pin 31 which serves as a driving connection for the ignition distributor indicated generally by the numeral 32. The speed ratio to the crank shaft can be changed by changing the number of ports to suit the most convenient speed.

In order to increase the volume of air entering the air valve, a fan or propeller 26' may be mounted on shaft 25 so as to increase the draft through the air valve above that which would be created by the suction from the engine cylinders.

It will thus appear that the air entering port 20 of the casing 17 is admitted to the interior of the valve casing and is intermittently allowed to pass through the openings 24 of the sleeve 22 as the same is rotated, and thence passes through the respective slots 19 of the casing, slots 18 of the blocks 16, and thence through the conduits 15 and 15' to the air manifolds 9. Also mounted concentrically within the casing 17 and disposed on the interior of the sleeve 22 is an adjustable sleeve 33 provided with two diametrically disposed ports 34. This sleeve has its bearing on the interior of casing 17 just below the rotatable sleeve 22 and is adjustable by means of an arm 35 so as to properly position the ports 34 with respect to the ports 19 of the casing. Arm 35 operates through a slot 35' in the casing 17. By means of this adjustment it will be apparent that the duration of communication between the interior of the air valve and the slots or ports 19 may be varied, or the sleeve may be moved to such position that communication may be entirely cut off between the interior of the casing and the conduits 15—15', thus throwing the air valve entirely out of effective operation.

It will also be apparent that when sleeve 33 is so positioned as to prevent the passage of air into conduits 15 and 15', all variations in the quantity of gases occupying the manifold 9, must occur by reason of a flow to or from this space through the openings provided at the entrances to the cylinders, at valves 11.

Engines when operated under the conditions such as to render the air valve inoperative, manifest the following substantial improvements over engines of conventional design:

First:—Improvements in the way of an increased delivery of power, during engine acceleration, due to an improved condition being produced in the movement of the gases in the admission manifold from the effects of manifold 9.

Second:—Improvements in the way of an increased delivery of power, under all operating conditions, due to a withdrawal of residual gases from the cylinder, through the intake port, into manifold 9, and a consequent better mixing of these residual gases with the fresh charge, which results in the ability to utilize a substantially increased compression pressure.

The time of opening and closing of the air valve with respect to the piston position should be varied with the trottle position of the engine, and in order to provide for this variation I provide a sleeve 36 containing two diametrically opposed ports 37 and a port 38 at its lower end communicating with the port 20 of the casing so as to allow the air from the conduit 6 to enter the interior thereof. This inner sleeve 36, if used, is adjusted to its proper position when the device is first installed and is then locked in fixed relation with the casing 17 by any suitable means; a screw 39 being here shown for that purpose. By reason of the position of the slots 37 in this fixed sleeve 36 it will be apparent that when the air valve is in operation the same will always be open at approximately the beginning of the induction stroke and that, no matter to what point the sleeve 33 may be adjusted, this initial opening of the air valve will not be varied. Obviously, however, its time of closing may be adjusted in accordance with the position of the adjustable sleeve 33; that is, in accordance with the positions of the ports 34 relative to the casing ports 19.

The operating rod 4 for the throttle valve is connected to a foot pedal 40 for operating the same. Also connected to this pedal is a rod 41 connected to the operating arm 35 for the air valve. This arm is biased in a direction to reduce the duration of opening of the valve by means of a coil spring 42 having its respective ends secured to the engine casing and to the arm. Rod 41 is formed of two aligned sections and connecting the adjacent ends of these sections are a cylinder and piston 43 and 44. This cylinder communicates at one end with the admission manifold 2 as by means of a flexible pipe 45. Under ordinary operation of the pedal 40 the air valve will be moved to open or partly open position in accordance with the movements of the pedal. When the engine is being driven by the vehicle, however, as when coasting with the throttle shut off, the suction created in manifold 2 will create a sufficient vacuum in the cylinder to cause a movement of the cylinder 43 so as to swing the arm 35 in the direction for increasing the duration of opening of the valve. By this means greater quantities of atmospheric air are allowed to enter the engine cylinders and reduce the breaking effect of the engine.

The operation of the device in its entirety will now be described, it being assumed that the arm 35 is in the correct position for idling speed of the engine.

Between the closing of one of the admission valves 11 and the opening of another in the same set of three cylinders one of the passages 24 in sleeve 22 will come into registration with a passage 19 in the casing 17 and air will be allowed to pass through the proper conduit 15—15' to the air manifold 9. Then, as the admission valve begins to open, the negative pressure within the manifold 8 for the explosive mixture will tend to be raised to atmospheric pressure by the flow of air around the valve seat 14 on the lower end of pipe 12 into the manifold 8, thereby allowing the explosive mixture to withdraw away from the cylinder temporarily. This preliminary flow of air into the admission manifold displaces the explosive mixture and prevents its entrance into the cylinder during the first part of the induction stroke, thereby preventing the ignition of a rarefied mixture from any after burning of the previous charge, and also establishing a volume of air which must be drawn into the cylinder prior to the entrance of any explosive mixture. The quantity of additional air which will be drawn into the cylinder from the air manifold after the foregoing action takes place will be dependent upon the relative resistances offered by the two manifolds 8 and 9, up to the time that air is prevented from entering the conduits 15—15' by reason of the particular passage 24 passing out of communication with the particular port 19 in the casing 17. Due to the quantity of air entering the cylinder being dependent upon the relative resistances offered by the two manifolds and as any change in the throttle position or fuel to air ratio in the explosive mixture effects a change in the resistance in the manifold 8 for the explosive mixture, as does also any change in duration of opening of the air valve effect a change in the resistance to air passing through manifold 9, it is apparent that a correct proportion of air and explosive mixture will be drawn into the cylinder at any throttle position or engine speed.

As the sleeve 22 continues to rotate, the several ports 24 therein will be successively brought into communication with the ports 19 in the casing in proper timed relation with the opening and closing of the admission valves, due to the fact that the sleeve is geared to rotate in a definite relationship to the crank shaft of the engine. Under coasting or such other conditions of operation of an automobile, or the like, as would cause a decrease in manifold pressures below normal, such pressures will cause piston 44 to be drawn farther into cylinder 43, thereby increasing the duration of air valve opening, thus reducing the braking action of the engine such as now occurs in the conventional types of engines by reason of the excess negative pressure created in the cylinders.

In the event that the engine is to operate at very slow idling speeds, the operating arm 35 may be moved to the left, Fig. 7, by spring 42 a sufficient distance to throw the air valve completely out of operation, but it is to be noted that the interposed cylinder 43 in rod 41 is of such length as to be able to cause a movement of the arm 35 through its entire range. By reason of this arrangement which permits the throttle to be substantially closed while the air valve is maintained open under certain conditions, a considerable saving in fuel is provided for, and this saving is further increased by reason of the fact that the entrance of air into the cylinders to prevent the formation of excessive vacuums will allow the automobile to drift a much greater distance by reducing the braking effect of the engine.

As previously stated, the sleeve 33 may be adjusted between its two extreme limits by arm 35 and its connections so as to vary the time during which the cylinders are open to atmospheric air according to throttle position. I may prefer, however, to employ the sleeve 33 in only two positions, namely, that in which the air valve is thrown into full operation or that in which it is thrown entirely out of operation, since the action of the air in passing from the air manifold 9 into the manifold 8 automatically functions over a considerable range to properly vary the amount of air entering the cylinders in accordance with engine speeds or throttle position, thereby eliminating the necessity for intermediate adjustments of the arm 35.

While it is desirable, of course, under certain conditions to vary the time during which the cylinders are open to atmospheric air, it is, nevertheless, advisable that the air valve A shall be opened at least as early as the beginning of the induction stroke and closed before the completion of said stroke. Therefore, the openings 37 in the sleeve 36 are so positioned that when the arm 35 is moved to operative position the air valve will be opened at substantially the begining of the induction stroke. But by reason of this sleeve and its operative relation with the adjustable sleeve 33 the time at which the valve is closed with respect to the piston position may be varied in accordance with the position of the ports 34 in sleeve 33.

By reason of the construction above described, as well as the modified form about to be described, it will be apparent that the quantity of explosive mixture passing through the admission manifold is reduced to such a quantity that the heat available from the exhaust gases is sufficient to raise the temperature of the explosive gases to a much higher degree under all operating conditions, thereby permitting a less volatile fuel to be vaporized and ignited by conventional methods. Also, by reason of the presence of an excess quantity of oxygen in the cylinder at the time of ignition, a supplemental quantity of a still lower grade of fuel may be injected into the cylinder, ignition of which will take place due to the increased temperature and pressure obtained from the initial explosion. It will thus be apparent that only sufficient previously vaporized fuel is necessary to obtain the initial explosion, the regulation of power and speed being obtained by varying the quantity of low grade fuel injected into the cylinder.

In previous attempts to save fuel consumption by the utilization of air projected into the manifold, the devices have proved impractical or entirely inoperative, due apparently to a change in the fuel to air ratio of the explosive mixture, or due to an unbalancing effect on the distribution of the explosive mixture to the cylinders. This difficulty is avoided in the present method by displacing the explosive mixture with a quantity of air which prevents the entrance of any explosive mixture into the cylinder until such time as the cause of premature ignition is suppressed.

Reverting to the specific mechanism shown, it is to be noted that in lieu of placing the inner terminal of the air manifold concentrically with respect to the inner terminal of the admission manifold these two manifolds might be placed side by side and separate valves employed for controlling their outlets. Under such circumstances a lateral passage could be provided to permit a preliminary flow of air into the admission manifold for displacing the explosive mixture so as to retard its flow into the engine cylinder until after the charge of air has entered.

In Figures 9 to 15, inclusive, I have shown a modified construction for carrying out the present method and which is substantially identical with the form heretofore described except that the air valve is comprised of a plurality of discs instead of sleeves such as shown in Figures 1 to 8, inclusive. In this modified construction the air valve casing is indicated by the numeral 50, and its cover 51 is provided with an opening 52 of any desired size which may communicate with a conduit leading from an air cleaner as described in connection with the first construction for carrying out the invention. The base of the casing is provided with diametrically opposite openings 53 with which are connected conduits 15 and 15' leading to the branches of the air manifold.

Mounted in the base of casing 50 and fixed to rotate with shaft 26 is a disc 54 provided with properly spaced openings 55. The rotation of this disc serves to control the time at which the various cylinders are open to the atmosphere, and, as will be noted from an inspection of Figure 14, certain of the walls of these openings are beveled as indicated by numeral 56 so as to induce or increase the draft of atmospheric air entering the casing through opening 52 of the casing. If found desirable, this draft may be further increased by the use of a fan or blower 57 as in the previously described form. Mounted above the rotatable disc 54 is an adjustable disc 58 provided with a pair of diametrically opposed openings 59. This disc, which is the equivalent of the sleeve 33, is provided with an operating arm 35 for connection with the control rod 41 as heretofore described. Disposed above the adjustable disc 58 is a disc 60 provided with a pair of diametrically opposite openings 61 each preferably having a circumferential dimension equal to the sum of the similar dimensions of the openings in the discs 54 and 58. This disc 60, when used, is adjusted to its proper position when the device is installed and is then permanently locked in such position by a screw 62.

The purpose and function of the several discs are identical with the purpose and function of their corresponding sleeves in the previously described form of the air valve, and repetition of this phase of the invention is believed to be unnecessary. It should be noted, however, that by the use of discs in lieu of sleeves a more compact arrangement is permissible and thus adapts the device for use in automobiles where available space is limited.

Two forms of air valves, as applied to multiple cylinder four-cycle poppet valve engines, have been shown herein and their action described, both forms being operated at one-half crank shaft speed. It is to be understood, however, that the drawings and description are merely for the purpose of making the mutual action of the gases more clear. The air valves may be operated at other than one-half crank shaft speed and be used on engines having one or more cylinders operating on the two or four-cycle principle in conjunction with various forms of valve mechanisms, so long as a quantity of air, in which there is no explosive mixture, is provided, for entrance into the cylinder during the very first part of the induction stroke, the air being subject to the same forces that would have acted upon the explosive mixture at that pressure, had no additional air been admitted, and also so long as the air is subject to the same forces as the explosive mixture while the air valve is open.

From the foregoing description taken in connection with the accompanying drawings it will be observed that I have provided a new and novel method of introducing an explosive charge into an engine cylinder, and which permits of the conversion of a greater percentage of the energy contained in the fuel into usable power; that the method also prevents the loss of energy incident to the high vacuum obtained within the cylinders of conventional engines when being rotated with a substantially closed throttle such as now occurs under coasting conditions when the engine is employed for automotive purposes; that the use of a lower grade of fuel is admissible in practicing the method; that two comparatively simple and inexpensive forms of apparatus are disclosed for performing the method; and that, due to the construction and arrangement shown and described, an automatic proportioning of the explosive mixture and air is provided for any throttle position.

It will be understood that the method and means for discharging air to momentarily eliminate combustible gas from the end of the inlet manifold or at the rear side of the valve, is applicable to the types of valves other than the poppet valve illustrated, such as reciprocating or rotating sleeve valve types, and I do not restrict myself to the details herein described except as required by the appended claims.

What I claim as new and desire to secure by Letters Patent is:

1. An internal combustion engine including a cylinder, an admission manifold, a throttle valve, a valve for controlling the admission of gases from the manifold to the cylinder, and means for causing a controllable quantity of the gases in the admission manifold to flow away from the cylinder.

2. An internal combustion engine including a cylinder, admission and exhaust manifolds, a throttle valve, valves for controlling said manifolds, and means for causing a controllable quantity of the gases in the admission manifold to withdraw from the entrance to the cylinder.

3. An internal combustion engine including a cylinder, manifolds for the admission of an explosive mixture and air to the cylinder, and means for intermittently controlling the flow of explosive mixture and air from said manifolds, said manifolds and means being so constructed and arranged as to prevent the explosive mixture from entering the cylinder when the air manifold is opened.

4. In an internal combustion engine including a cylinder with admission and exhaust ports and an admission manifold, an air manifold intermittently in communication with the admission manifold, and means for intermittently preventing the admission of air into said air manifold.

5. An internal combustion engine including a cylinder, manifolds for the admission of an explosive mixture and air to the cylinder, means for intermittently opening said manifolds to the cylinder, and means for intermittently closing the passage through said air manifold.

6. An internal combustion engine including a cylinder, manifolds for the admission of an explosive mixture and air to the cylinder, means for simultaneously opening said manifolds to the cylinder, and means for intermittently shutting off the entrance of air to said air manifold.

7. An internal combustion engine including a plurality of cylinders, manifolds for the transmission of explosive mixture and air to the cylinders, a conduit for conducting air to the air manifold, means for intermittently opening the manifolds to the cylinders, and means associated with the conduit for intermittently shutting off the entrance of air to the conduit.

8. In an internal combustion engine including a cylinder with admission and exhaust ports and an admission manifold, a rotatable valve operated by the engine for consecutively interrupting the admission of air into the admission manifold.

9. In an internal combustion engine including a cylinder with admission and exhaust ports, air and air-fuel mixture passages communicable adjacent the cylinder, and a rotating valve for varying relatively the quantity of air and explosive mixture entering the cylinder.

10. An internal combustion engine including a cylinder having an admission port, a manifold for conducting an explosive mixture to the cylinder and communicating with said port, a second manifold for conducting air to the cylinder, said second manifold having its discharge end arranged adjacent said admission port, and an imperforate valve member for closing said admission port and the discharge end of the air manifold.

11. In an internal combustion engine having an admission manifold for explosive mixture and a manifold for conducting a preliminary charge of air to each cylinder, means for intermittently shutting off the entrance of air to the manifold, said means including a rotatable sleeve provided with one or more passages.

12. In an internal combustion engine having an admission manifold for explosive mixture and a manifold for conducting a preliminary charge of air to each cylinder, means for intermittently shutting off the entrance of air to the manifold, said means including a casing having a passage, and a rotatable member provided with a passage adapted to intermittently register with the passage in said casing.

13. In an internal combustion engine having an admission manifold for explosive mixture and a manifold for conducting a preliminary charge of air to each cylinder, means for intermittently shutting off the entrance of air to the manifold, said means including a casing having an outlet, a rotatable sleeve provided with a passage through its wall adapted to intermittently register with the outlet in said casing, and an adjustable sleeve provided with a passage in its wall and adapted to control the flow of air through the passage of said rotatable sleeve.

14. In an internal combustion engine having an admission manifold for explosive mixture and a manifold for conducting a preliminary charge of air to each cylinder, means for intermittently shutting off the entrance of air to the manifold, said means including a casing having an outlet, a rotatable sleeve provided with a passage through its wall adapted to intermittently register with the outlet in said casing, an adjustable sleeve provided with a passage in its wall and adapted to control the flow of air through the passage of said rotatable sleeve, and an inner sleeve provided with a passage in its wall, said inner sleeve serving to prevent a variation in the time of opening of said manifold to the admission of air.

15. In an internal combustion engine having an admission manifold for explosive mixture and a manifold for conducting a preliminary charge of air to each cylinder, means for intermittently shutting off the entrance of air to the manifold, said means including a casing having an outlet, a rotatable sleeve provided with a passage through its wall adapted to intermittently register with the outlet in said casing, an adjustable sleeve provided with a passage in its wall and adapted to control the flow of air through the passage of said rotatable sleeve, an inner sleeve provided with a passage in its wall, said inner sleeve serving to prevent a variation in the time of opening of said manifold to the admission of air, and means on the casing for locking said last named sleeve against rotation.

16. In an internal combustion engine having an admission manifold and a throttle valve for closing said manifold, a second manifold for conducting a preliminary charge of air to the engine cylinder, means for intermittently shutting off the admission of air to said air manifold, means for controlling said last named means so that the throttle valve can be moved to close the admission manifold while the controlling means is adjusted to a position to admit air to said air manifold.

17. The method of introducing a charge of explosive mixture into an engine cylinder which comprises first projecting air into the inner end of the admission manifold for the explosive mixture to retard the admission of the explosive mixture to the cylinder, drawing a charge of air into the cylinder, and then drawing the projected air and explosive mixture from the admission manifold into the cylinder.

18. The method of proportioning the amount of explosive mixture and air entering an engine cylinder which comprises, projecting a quantity of air into the cylinder and admission manifold, said quantity of air varying inversely with the degree of opening of the throttle, and drawing the air and explosive mixture from the manifold into the cylinder.

19. The method of introducing the charge of explosive mixture into an engine cylinder, which comprises first projecting air into the admission manifold for explosive mixture, and then supplying a charge by means of the admission manifold and a separate air supply.

20. The method of introducing a charge into an engine cylinder which comprises, first preventing the entrance of explosive mixture to the cylinder, then subjecting the explosive mixture and a separate source of air supply to equal forces for inducing a portion of the charge into the cylinder, then preventing the flow of air into the cylinder while continuing the induction of explosive mixture, and finally shutting off the entrance of explosive mixture.

21. The method of controlling the quantity of fuel entering a cylinder which comprises, projecting air into the admission manifold, and proportioning the quantity of explosive mixture entering the cylinder in accordance with the ratio of fuel to air in the explosive mixture.

22. The method of introducing a charge into an engine cylinder which comprises, first projecting air into the inner end of an admission manifold, and then projecting the air and an explosive mixture into the cylinder.

23. The method of introducing a charge of fuel in an internal combustion engine which includes first introducing a quantity of low grade fuel and air and then through the same opening an explosive charge preceding the compression cycle.

24. In an internal combustion engine having an admission manifold and an air manifold, means for intermittently causing a transference of gases between said manifolds.

25. In an internal combustion engine having a cylinder and two manifolds for the supply of gases for said cylinder, an imperforate valve for intermittently severing communication between said manifolds.

26. In an internal combustion engine, a cylinder, an imperforate admission valve in said cylinder, and two passages associated with said valve and so arranged as to establish intercommunication when said valve is opened.

27. In an internal combustion engine having a chamber, an admission manifold, and a positively operated imperforate intake valve, an intake port composed of two annular passages one of said passages being continuously in communication with the admission manifold and the other of said passages being continuously in communication with the chamber, means for causing the said two passages to be communicable with each other during the entire time the intake valve is out of contact with its seat.

28. In an internal combustion engine having a multiplicity of cylinders and an admission manifold, positively operated imperforate intake valves, two annular passages associated with each of said intake valves, one of said annular passages being in communication with the admission manifold, the other of said passages being in communication with a passage separate from the said admission manifold.

29. In an internal combustion engine having a cylinder and a positively operated imperforate intake valve, an intake port adjoining said valve composed of two passages so arranged as to be in communication with each other during the entire induction cycle.

30. In an internal combustion engine having a multiplicity of cylinders, two or more intake ports comprising a multiplicity of passages substantially concentric with an imperforate intake valve, a manifold in communication with one of said passages in two or more of said intake ports, and a passage in communication with another of said passages in two or more of said intake ports.

31. In a multiple cylinder internal combustion engine, a multiplicity of intake ports each consisting of two passages substantially concentric with an imperforate intake valve, a manifold in communication with one of said passages in two or more of said intake ports, and a passage in communication with the other of said passages in two or more of said intake ports.

32. An internal combustion engine including a cylinder, manifolds for the admission of explosive mixture and air to the cylinder, means for intermittently opening said manifolds to the cylinder, means for consecutively opening and closing the passage for air into said air manifold, and means for intermittently closing the passage through said air manifold.

33. In an internal combustion engine including a multiplicity of combustion chambers, an intake port in each of said combustion chambers, a passage for conveying fuel and air mixture to said ports, an aperture the area of which is varied during the operation of the intake valve located adjacent each of said ports, a second passage communicating with two or more of said apertures.

34. The method of charging the cylinder of an internal combustion engine which comprises segregating a pressure created by the inspiration of a charge into a working cylinder until a following opening movement of an intake valve occurs for withdrawing a quantity of residual gases from the cylinder through the intake valve port controlled by the said intake valve having the following opening movement, and then distributing the said residual gases through the combustible charge.

JOSEPH REX DAVIS.